United States Patent [19]

Charra et al.

[11] Patent Number: 5,684,622

[45] Date of Patent: Nov. 4, 1997

[54] PROCESS FOR THE PRODUCTION OF SELF-ORGANIZED, TRANSPARENT, ORGANIC POLYMER STRUCTURES FOR OPTICAL FREQUENCY CONVERSION

[75] Inventors: Fabrice Charra, Marcoussis; Céline Fiorini, Villebon si Yvette; André Lorin, Orsay; Jean Michel Nunzi, Antony; Paul Raimond, Le Kremlin-Bicetre, all of France

[73] Assignee: Commissariat a l'Energie Atomique, Paris, France

[21] Appl. No.: 611,819

[22] Filed: Mar. 6, 1996

[30] Foreign Application Priority Data

Mar. 28, 1995 [FR] France ............... 95 03616

[51] Int. Cl.$^6$ ............... G02F 1/35
[52] U.S. Cl. ............... 359/326; 359/332
[58] Field of Search ............... 359/326–332

[56] References Cited

U.S. PATENT DOCUMENTS

| | | | |
|---|---|---|---|
| 4,199,698 | 4/1980 | Bethea et al. | 359/328 |
| 4,622,409 | 11/1986 | Nicoud et al. | 359/328 X |
| 4,828,758 | 5/1989 | Gillberg-LaForce et al. | 359/329 X |
| 5,080,764 | 1/1992 | Kester et al. | 359/326 X |
| 5,321,791 | 6/1994 | Fauvarque et al. | 359/326 X |

OTHER PUBLICATIONS

Optics Letters, vol. 18, No. 12, pp. 941–943, Jun. 15, 1993, F. Charra, et al., "Light–Induced Second–Harmonic Generation in Azo–Dye Polymers".

Optics Letters, vol. 19, No. 14, pp. 1025–1027, Jul. 1994, Rami Cohen, et al., "Creation of Second–Order Nonlinearity in Polymers by Light–Induced Asymmetric Charge Injection".

Optics Letters, vol. 12, No. 8, pp. 585–587, Aug. 1987, R.H. Stolen, et al., "Self–Organized Phase–Matched Harmonic Generation in Optical Fibers".

Primary Examiner—John D. Lee
Attorney, Agent, or Firm—Oblon, Spivak, McClelland, Maier & Neustadt, P.C.

[57] ABSTRACT

A transparent, organic polymer substrate organized for optical frequency conversion is prepared by subjecting a material of a transparent, organic polymer which incorporates therein transparent, active organic molecules which have a second order, microscopic, optical nonlinearity to the simultaneous action of a first laser beam at fundamental frequency $\omega$ and a second laser beam of second harmonic frequency $2\omega$ for a time adequate to induce a second order, macroscopic nonlinearity in the transparent active organic molecules in the structure.

11 Claims, 1 Drawing Sheet

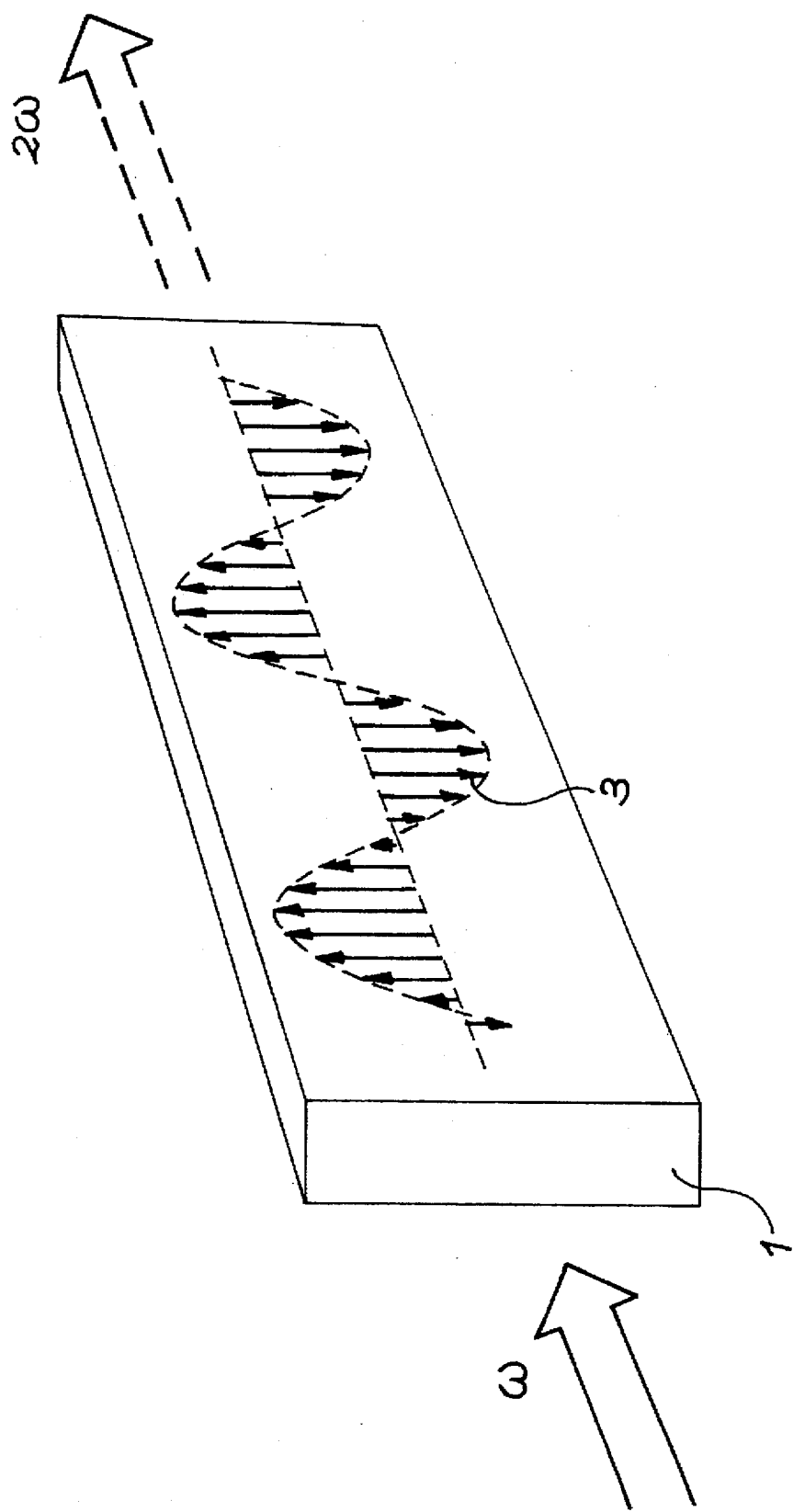

PROCESS FOR THE PRODUCTION OF SELF-ORGANIZED, TRANSPARENT, ORGANIC POLYMER STRUCTURES FOR OPTICAL FREQUENCY CONVERSION

DESCRIPTION

The present invention relates to a process for the production of transparent, organic polymer structures for producing self-organized devices for frequency conversion. Such devices can be used for producing blue laser microsources.

At present considerable interest is being expressed in blue-emitting laser microsources and extensive research has been undertaken. Such sources can be used in the field of medical instrumentation, telecommunications and more particularly for optical information storage. In the latter case, the existence of a blue-emitting laser source would make it possible to increase the density of stored and optically read informations. Thus, the minimum surface occupied by the information unit is approximately the square of the wavelength, so that the division of the wavelength by two makes it possible to multiply by four the stored information density.

However, certain problems are encountered in the production of blue-emitting laser sources. Thus, the following methods can be envisaged for producing such sources:
 direct emission in the blue with the aid of laser diodes produced with large forbidden band semiconductors, as described by M. A. Haase, J. Qiu, J. M. DePuydt and H. Cheng "Blue and green laser diodes", Applied Physics letters, 59, (11), 1991, p 1272,
 parametric amplification phenomenon using an infrared pumping beam, as described by T. Hebert, R. Wannemacher, W. Lenth, M. MacFarlane "Blue and green cw upconversion lasing in Er:YLiF$_4$", Applied Physics Letters, 57, 17, 1990, p 1727 and
 frequency doubling of commercially available laser diodes emitting in the near infrared.

The use of the first two methods gives rise to numerous technical difficulties, because the operation of such sources has hitherto only been possible at very low temperatures (77 and 35 K). However, the third method using frequency doubling appears to be more promising, because the technology of laser diodes emitting in the red and near infrared has been well mastered. However, as can be concluded from the article by W. P. Risk "Compact blue laser devices" in Optics and Photonics News, May 1990, p 10, it is difficult to obtain a high conversion efficiency using this method.

The frequency doubling phenomenon is a nonlinear optical process using a laser beam at fundamental frequency $\omega$ sufficiently intense to polarize a material medium in an anharmonic manner, which leads to the appearance of a double frequency $2\omega$.

The polarization induced in the medium can be written:

$$P_{2\omega} = \epsilon_0 \chi^{(2)} E_\omega^2$$

in which $\epsilon_0$ represents the dielectric constant of the medium, $\epsilon\omega$ the amplitude of the optical field at fundamental frequency $\omega$ and $\chi^{(2)}$, the second order susceptibility, characterizes the efficiency of energy transfer between the fundamental wave and the harmonic wave.

Therefore, for said frequency doubling, it is necessary to have a material with a second order nonlinear coefficient $\chi^{(2)}$ which relates both to the microscopic and macroscopic properties of the material.

The obtaining of microscopic properties presupposes that the most polarizable electrons must firstly be linked with an asymmetrical potential (in order to have an order 2 anharmonicity of their movement), so that for doubling the frequency a molecule must not have an inversion centre.

The obtaining of macroscopic properties means that the molecules must be oriented in an assembly without inversion centre, so that their different polarizations can constructively radiate.

As spontaneous orientation is not a natural tendency for most molecules, the main difficulty is therefore in the production of non-centrosymmetrical structures.

Such structures can be obtained from organic or inorganic crystals or from oriented polymers. In the case of polymers, said orientation can be obtained in conventional manner by hot corona polarization at a temperature close to the glass transition point of the polymer for aligning the active molecules under a strong static electric field.

In the case of organic or inorganic crystals, good results are obtained for the doubling of high intensities, but numerous problems remain to be solved when doubling low intensities (10 to 100 mW). In addition, the production costs of such crystals remain relatively high.

In the case of organic polymers, it is difficult to obtain satisfactory efficiency levels for the second harmonic generation.

Thus, the second harmonic generation efficiency is dependent on the pumping power density and the interaction length in the medium. Due to the dispersion of the refractive indices, a phase detuning appears during propagation between the already generated, nonlinear wave and the nonlinear polarization created. Thus, this phase detuning limits the length on which second harmonic generation is effective. Moreover, in a waveguide configuration, in order to maintain high power densities over significant distances, it is necessary to have an overlap of the fundamental frequency and second harmonic modes within the guide. However, it is difficult to obtain a phase tuning and a mode overlap simultaneously with polymers oriented by the corona method.

The present invention relates to a process for the production of a self-organized, transparent, organic polymer structure for optical frequency conversion which, through the use of a completely optical polarization method, makes it possible to obtain a structure satisfying the simultaneous phase tuning and mode overlap conditions.

The invention therefore relates to a process for the production of a transparent, organic polymer structure organized for optical frequency conversion, characterized in that a material constituted by a transparent, organic polymer incorporating transparent, active organic molecules and having a second order, microscopic, optical nonlinearity is subject to the simultaneous action of a first laser beam at fundamental frequency $\omega$ and a second laser beam of second harmonic $2\omega$ for a time adequate to induce a second order, macroscopic nonlinearity in the structure.

Thus, according to the invention, use is made of a novel method for orienting active molecules based solely on optical interactions. Optical interactions of this type have been used prior to the invention for polarizing materials in non-centrosymmetrical structures in the case of a silica optical fibre, as described by R. H. Stolen and H. W. K. Tom "Self-organized phase-matched second harmonic generation in optical fibers", Optics Letters, 12, 8, 1987, p 585 and T. J. Driscoll and N. M. Lawandy, "Optically encoded second harmonic generation in bulk silica based glasses", Journal of the Optical Society of America, B, 11, 2, 1994, p 355.

This type of optical interaction has also been used for inducing a second order nonlinearity in an organic material absorbing at the double frequency 2 ω, as described by F. Charra et al in Optics Letters, vol. 18, No. 72, 1993, p 941.

In the latter case, the obtaining of the second order nonlinearity makes use of absorption-based molecule exciting mechanisms, which gives rise to a selection of molecules oriented either vertically or horizontally, followed by a photoisomerization.

In the present invention, it would not be possible to expect the obtaining and orientation of the molecules under the simultaneous action of two laser beams, because the molecules which have to be oriented are transparent.

However, it has been possible to orient by means of laser beams active, transparent, organic molecules included in a transparent polymer, host matrix by using completely optical mechanisms.

These transparent, active, organic molecules can be molecules of the "push/ pull" type, i.e. having both an electron donor group and an electron acceptor group, separated from one another by one or more groups having conjugate π electron systems, i.e. displaceable on several atoms.

Such molecules can comply with the formula:

A-(B)-D in which A is an electron acceptor group, D an electron donor group and (B) is formed by one or more aromatic nuclei optionally having one or more heteroatoms.

The electron donor groups D can e.g. be of the alkyl type such as $CH_3$, alkoxy type such as $OCH_3$, amino or substituted amino type such as $N(CH_3)_2$.

The electron acceptor groups A can e.g. be of the cyano type (C≡N), formyl type (CHO), acetyl type ($COCH_3$) or nitro type ($NO_2$).

The aromatic nuclei (B) optionally having one or more heteroatoms such as O, S and N can e.g. be benzene, thiophene, pyridine, pyrazole, furan or biphenyl.

As examples of such active molecules reference can be made to paranitroaniline and its derivatives.

According to a first embodiment of the invention, these active molecules are fixed in the polymer by covalent bonds.

In this case the material subject to the simultaneous action of two laser beams is a copolymer of a first polymerizable monomer and a second polymerizable monomer covalently linked to the active, organic molecule.

Such copolymers can e.g. be obtained from a first monomer of the acrylate or methacrylate type and a second monomer also of the acrylate or methacrylate type, covalently linked to the active, organic molecule.

As an example of such a copolymer reference can be made to the copolymer of methyl methacrylate (MMA) and N-ethyl-N(methacryloxyethyl)-paranitroaniline Such polymers can be prepared in conventional manner by radical polymerization methods using a radical polymerization initiator such as χ, χ-azoisobutyronitrile, benzoyl peroxide or terbutyl peroxide.

According to a second embodiment of the invention, the active, organic molecules are dispersed in a transparent, organic polymer without being covalently linked thereto. In this case, the organic polymer serves as a matrix and the active, organic molecules are dissolved in said host matrix.

Such materials can be prepared by dissolving the polymer and molecules in a solvent, followed by the evaporation of said solvent.

In the two embodiments of the invention, the content of active, organic molecules of the starting polymer material is chosen so as to obtain a high, second order, nonlinear coefficient $\chi^{(2)}$ (avoiding excessive concentrations, which could give rise to the recrystallization of the molecules within the polymer matrix). In general, the starting polymer or copolymer contains 1 to 50 wt. % of active, organic molecules.

According to the invention, the material subject to the simultaneous action of two laser beams can be in different forms. Generally, it is in the form of a waveguide, solid bar or fibre. In the case of a waveguide, the latter can be obtained by depositing on a glass substrate, e.g. by centrifuging, a thin layer of a solution of the polymer or copolymer incorporating the active, organic molecules. In the case of a fibre, the latter can be obtained from a solid bar by drawing. In all cases, the material subject to the action of the two laser beams is isotropic and consequently has no second order, nonlinear property.

To obtain this nonlinearity, onto the material is simultaneously passed an intense laser beam, optionally in the pulse mode, at the fundamental frequency ω and a weaker, second harmonic 2 ω beam (known as the seed beam), resulting from the frequency doubling of the fundamental beam.

The polarizations of these two beams can be variable, but preference is generally given to a configuration in which the polarizations of these two beams are linear and parallel.

Generally working takes place at ambient temperature, but it is also possible to subject the material to the action of the two beams at a temperature above or below ambient temperature, but still below the glass transition point of the polymer.

The time during which the material is subject to the simultaneous action of the two laser beams is dependent on the nature of the material, its shape or form, the power of these writing beams and the resonant frequency of the laser shots. Generally durations of a few minutes to a few hours are adequate for obtaining the desired properties.

Other features and advantages of the invention can be gathered from the following description of a non-limitative embodiment with reference to the attached drawing, which diagrammatically shows a polymer bar oriented by the process of the invention.

The following example illustrates the production of a copolymer bar of methyl methacrylate (MMA) and N-ethyl-N(methacryloxyethyl)-paranitroanlline methacrylate (MMA-PNA).

In order to prepare the copolymer, use is made of 40 mg of the second monomer MMA-PNA and 2 g of the first monomer MMA and the radical mass polymerization method is used. This gives a copolymer having 2% active molecules.

From the copolymer obtained is formed an 8 mm long, approximately 1 cm diameter, cylindrical bar by moulding followed by polishing of the front and rear faces.

This bar is then subject to the simultaneous action of a first laser beam constituted by a pulsed $Nd^{3+}$:YAG laser supplying 25 picosecond pulses at a repetition rate of 10 Hz and a second laser beam or second harmonic seed beam obtained from the same laser by frequency doubling of the fundamental beam through a potassium diphosphate (KDP) crystal.

The configuration used corresponds to the case where the two laser beams are polarized in parallel. After polarization, the energy per pulse is 0.5 mJ for the first laser beam and 2.5 μJ for the second beam at 2 ω, the diameter of each of the laser beams being approximately 1 millimetre.

After 15 hours irradiation, the bar has a periodic orientation of the active, nonlinear, organic paranitroanlline (PNA) molecules. This structure is shown in the attached drawing, where it is possible to see in the bar 1 that the molecules are oriented periodically in accordance with the arrows 3.

With such a structure, when the bar is subject to the action of a laser beam of frequency ω, after focussing, the naked eye can directly observe the second harmonic 2 ωsignal generated by the bar.

In the case of an optimum setting of the relative intensities of the writing beams, the maximum second harmonic, generation efficiency corresponds to a value of the nonlinear, second order coefficient $\chi^{(2)}$ close to $1.5 \cdot 10^{-15}$ m/V and no significant decay or fall of the signal is observed after stopping the polarization process over durations of several dozen hours.

Although the value given hereinbefore of the coefficient $\chi^{(2)}$ still corresponds to relatively low conversion efficiencies, the material prepared according to the invention still permits a significant frequency doubling of relatively low powers, of a few hundred mW.

Therefore the process according to the invention is very advantageous. Moreover, the use of polymers for frequency conversion makes it possible to envisage the drawing of such materials and their implementation in the form of optical fibres. Thus, for illustration purposes, an optical fibre of this type with a length of 60 cm and with a core diameter of 5 μm, would be constituted by 50 wt. % nonlinear, organic molecules and would make it possible to obtain efficiencies of approximately 1% for an input power at fundamental frequency of 150 mW, which corresponds to the typical powers supplied by existing GaAl/GaAlAs laser diodes.

Finally, the use according to the invention of an organic polymer is interesting due to its ease of technical implementation, its modest production costs, its high damage threshold and its ease of integration into optical circuits. The use of such polymers having nonlinear, organic molecules makes it possible, due to the choice of the molecules used, the obtaining of high, microscopic nonlinearities with an easy chemical synthesis. The oriented structures obtained by the process according to the invention also have the advantages indicated below.

The associated polarization method is easy to implement when compared with standard, hot polarization methods under a strong, static electric field ($10^6$ V/cm). It also makes it possible to design and implement optical circuits by the displacement of the focussing point of the two laser beams along the material.

The materials obtained by this process are automatically phase-tuned and consequently permit aa effective frequency doubling on theoretically infinite, interaction lengths.

Such organized structure materials can be more generally used for frequency conversion (wave mixing, electrooptical modulation).

We claim:

1. A process for the production of a transparent, organic polymer structure organized for optical frequency conversion, comprising:

subjecting a material of a transparent, organic polymer which incorporates therein transparent, active organic molecules, which have a second order, microscopic, optical nonlinearity, to the simultaneous action of a first laser beam at fundamental frequency ω and a second laser beam of a second harmonic frequency 2 ω for a time adequate to induce a second order, macroscopic nonlinearity in the transparent, active organic molecules in the structure.

2. The process of claim 1, wherein said material subject to the simultaneous action of the two laser beams is a copolymer of a first polymerizable monomer and a second polymerizable monomer covalently linked to the active, organic molecule.

3. The process of claim 2, wherein said material is a copolymer of methyl methacrylate and N-ethyl-N-(methacryloxyethyl)paranitroaniline.

4. The process of claim 1, wherein said material subject to the simultaneous action of the two laser beams is a transparent, organic polymer in which is dissolved the active, organic molecules.

5. The process of claim 1, wherein said active, organic molecules have the formula:

A-(B)-D wherein A is an electron acceptor group, D is an electron donor group and (B) is one or more aromatic nuclei optionally having one or more hetero atoms.

6. The process of claim 1, wherein said transparent, organic polymer contains 1 to 50 wt. % active, organic molecules.

7. The process of claim 1, wherein the polarizations of the two laser beams are linear and parallel.

8. The process of claim 1, wherein the first laser beam is a pulsed laser beam and said second laser beam is obtained by frequency doubling of the fundamental beam of the first laser beam.

9. A method of preparing an optical frequency conversion device comprising shaping the transparent, organic polymer, organized structure prepared by the process of claim 1 into the shape of an optical frequency conversion device.

10. The method of claim 9, wherein the optical frequency conversion obtained is a frequency doubling.

11. The method of claim 9, wherein said optical frequency conversion device is in the structure of a waveguide on a glass substrate, a solid bar or an optical fiber.

* * * * *